US012138665B1

(12) United States Patent
Kulbeth

(10) Patent No.: US 12,138,665 B1
(45) Date of Patent: Nov. 12, 2024

(54) SYSTEM AND METHOD FOR RECYCLING ANIMAL BEDDING MATERIAL

(71) Applicant: DEL Corporation, Lafayette, LA (US)

(72) Inventor: Robert M. Kulbeth, Church Point, LA (US)

(73) Assignee: DEL Corporation, Lafayette, LA (US)

(*) Notice: Subject to any disclaimer, the term of this patent is extended or adjusted under 35 U.S.C. 154(b) by 0 days.

(21) Appl. No.: 18/110,655

(22) Filed: Feb. 16, 2023

Related U.S. Application Data

(60) Provisional application No. 63/408,622, filed on Sep. 21, 2022.

(51) Int. Cl.
*B08B 3/02* (2006.01)
*B08B 3/04* (2006.01)
*B08B 3/14* (2006.01)

(52) U.S. Cl.
CPC ................ *B08B 3/02* (2013.01); *B08B 3/044* (2013.01); *B08B 3/14* (2013.01)

(58) Field of Classification Search
CPC .............. B08B 3/02; B08B 3/044; B08B 3/14
See application file for complete search history.

(56) References Cited

U.S. PATENT DOCUMENTS 3,437,487 A * 4/1969 Mason .................. A23K 40/20 99/534
4,205,624 A * 6/1980 Yacus .................... A01K 1/015 134/30
6,045,068 A * 4/2000 Ashbrook ................. C02F 1/34 366/173.2
6,099,660 A * 8/2000 Davis ..................... A01K 1/015 134/32
8,464,500 B2 6/2013 Townsend
10,227,240 B2 3/2019 Moe et al.
10,370,262 B2 8/2019 Moe et al.
10,556,843 B2 2/2020 Parker et al.
10,626,059 B2 4/2020 Townsend
10,995,041 B2 5/2021 Townsend
2003/0192485 A1* 10/2003 Opfel .................. A01K 1/0107 119/526
2003/0192816 A1* 10/2003 Opfel .................. A01K 1/0107 209/133
2003/0222000 A1* 12/2003 Opfel .................. A01K 1/0107 209/139.1
2007/0199903 A1* 8/2007 Denney ................ B01D 21/302 210/723

(Continued)

FOREIGN PATENT DOCUMENTS

WO WO-2022016032 A1 * 1/2022 ............... B09B 3/45

*Primary Examiner* — Benjamin L Osterhout
(74) *Attorney, Agent, or Firm* — Jones Walker LLP

(57) ABSTRACT

A system and method for cleaning used animal bedding generally made up of wood chips, manure, and urine. Large manure and debris are first separated from the used animal bedding. The remaining used animal bedding material is then mixed with a liquid to form a slurry. The slurry particles—other than the wood chips—are then reduced in size to facilitate the separation of the wood chips from the other slurry particles. Once separated, the wood chips can be reused as animal bedding. This system and method also provides for further processing of the remaining slurry particles into other products, such as mulch, fertilizer, and clean water.

23 Claims, 13 Drawing Sheets

(56) References Cited

U.S. PATENT DOCUMENTS

| | | | | |
|---|---|---|---|---|
| 2014/0352623 | A1* | 12/2014 | Townsend | C10L 5/44 264/319 |
| 2017/0196193 | A1* | 7/2017 | Cross | A01K 1/0155 |
| 2018/0332815 | A1* | 11/2018 | Hajda | A01K 1/0128 |
| 2019/0263727 | A1* | 8/2019 | Townsend | A01K 1/0155 |
| 2020/0231513 | A1 | 7/2020 | Townsend | |
| 2021/0238109 | A1 | 8/2021 | Townsend | |

* cited by examiner

SYSTEM AND METHOD FOR RECYCLING ANIMAL BEDDING MATERIAL

CROSS-REFERENCE TO RELATED APPLICATIONS

This application claims the benefit of and priority to U.S. Provisional Patent Application No. 63/408,622, filed on Sep. 21, 2022, which is incorporated herein by reference in its entirety.

BACKGROUND

The disclosure relates to a system for recycling used animal bedding material. The disclosure also relates to a method of recycling used animal bedding material.

SUMMARY

The disclosure relates to a system for recycling used animal bedding material.

In one embodiment, the system may include a first shaker adapted to separate a first solids from the used animal bedding material and produce a first underflow comprising a second solids. The first solids may comprise manure. The second solids may comprise wood chips and mulch. The system may include a first tank adapted to mix the first underflow with a first liquids to form a first slurry. The first liquids may comprise water. The system may include a slurry collider adapted to reduce the size of a fraction of the second solids in the first slurry and produce a collided first slurry. The fraction of the second solids may comprise mulch. The system may include a second shaker adapted to separate a third solids from the collided first slurry and produce a second underflow comprising a second slurry. The third solids may comprise wood chips.

In another embodiment, the slurry collider may comprise a first jet nozzle and a second jet nozzle, wherein the first jet nozzle is configured to discharge a first portion of the first slurry toward the second jet nozzle, wherein the second jet nozzle is configured to discharge a second portion of the first slurry toward the first jet nozzle.

In another embodiment, the second shaker may be further adapted to discharge the third solids onto a first conveyor. The first conveyor may be adapted to place the third solids into a third solids stockpile.

In another embodiment, the system may include a magnet adapted to remove one or more metallic components from the third solids while on the first conveyor, and a dryer adapted to remove a desired moisture content from the third solids before the third solids are placed into the third solids stockpile.

In another embodiment, the system may include a spray bar system adapted to flush the third solids on the second shaker with a second liquids. The second liquids may comprise water.

In another embodiment, the second liquids may further comprise a cleaning agent.

In another embodiment, the system may include one or more third shakers adapted to separate a fourth solids from the second slurry and produce a third underflow comprising a third slurry. The fourth solids may comprise mulch.

In another embodiment, the one or more third shakers may be further adapted to discharge the fourth solids onto a second conveyor. The second conveyor may be adapted to place the fourth solids into a fourth solids stockpile.

In another embodiment, the system may include a magnet adapted to remove one or more metallic components from the fourth solids while on the second conveyor.

In another embodiment, the system may include a water treatment unit adapted to separate a third liquids from the third slurry, produce a fifth solids, and place the fifth solids into a fifth solids stockpile. The third liquids may comprise a clean effluent.

In another embodiment, the water treatment unit may be further adapted to discharge the third liquids into a storage tank for reuse within the system.

In another embodiment, the system may include a hopper adapted to place the used animal bedding onto the first shaker.

The disclosure also relates to a method for recycling animal bedding material.

The method may include the step of separating a first solids from the used animal bedding material in a first shaker to produce a second solids underflow. The first solids may comprise manure, and the second solids underflow may comprise wood chips and mulch. The method may include the step of mixing the second solids with a first liquids to produce a first slurry. The first liquids may comprise water. The method may include the step of reducing the size of a fraction of the second solids in the first slurry in a slurry collider. The fraction of the second solids may comprise mulch. The method may include the step of separating a third solids from the first slurry in a second shaker to produce a second slurry. The third solids may comprise wood chips.

In another embodiment, the slurry collider may comprise a first jet nozzle and a second jet nozzle, wherein the first jet nozzle is configured to discharge a first portion of the first slurry toward the second jet nozzle, wherein the second jet nozzle is configured to discharge a second portion of the first slurry toward the first jet nozzle.

In another embodiment, the method may include the step of discharging the third solids onto a first conveyor for placement into a third solids stockpile.

In another embodiment, the method may include the step of passing the third solids under a magnet to remove one or more metallic components from the third solids while on the first conveyor. The method may include the step of drying the third solids in a dryer to remove a desired moisture content from the third solids before the third solids are placed into the third solids stockpile.

In another embodiment, the method may include the step of flushing the third solids on the second shaker with a second liquids via a spray bar system. The second liquids may comprise water.

In another embodiment, the second liquids may further comprise a cleaning agent.

In another embodiment, the method may include the step of separating a fourth solids from the second slurry in one or more third shakers to produce a third slurry. The fourth solids may comprise mulch.

In another embodiment, the method may include the step of discharging the fourth solids onto a second conveyor for placement into a fourth solids stockpile.

In another embodiment, the method may include the step of passing the fourth solids under a magnet to remove one or more metallic components from the fourth solids while on the second conveyor.

In another embodiment, the method may include the step of separating a third liquids from the third slurry in a water treatment unit to produce a fifth solids. The third liquids may comprise a clean effluent. The method may include the step of disposing of the fifth solids into a fifth solids stockpile.

In another embodiment, the method may include the step of storing the third liquids in a storage tank for reuse within the system.

BRIEF DESCRIPTION OF THE DRAWING VIEWS

DETAILED DESCRIPTION OF SELECTED EMBODIMENTS

Figure 1:
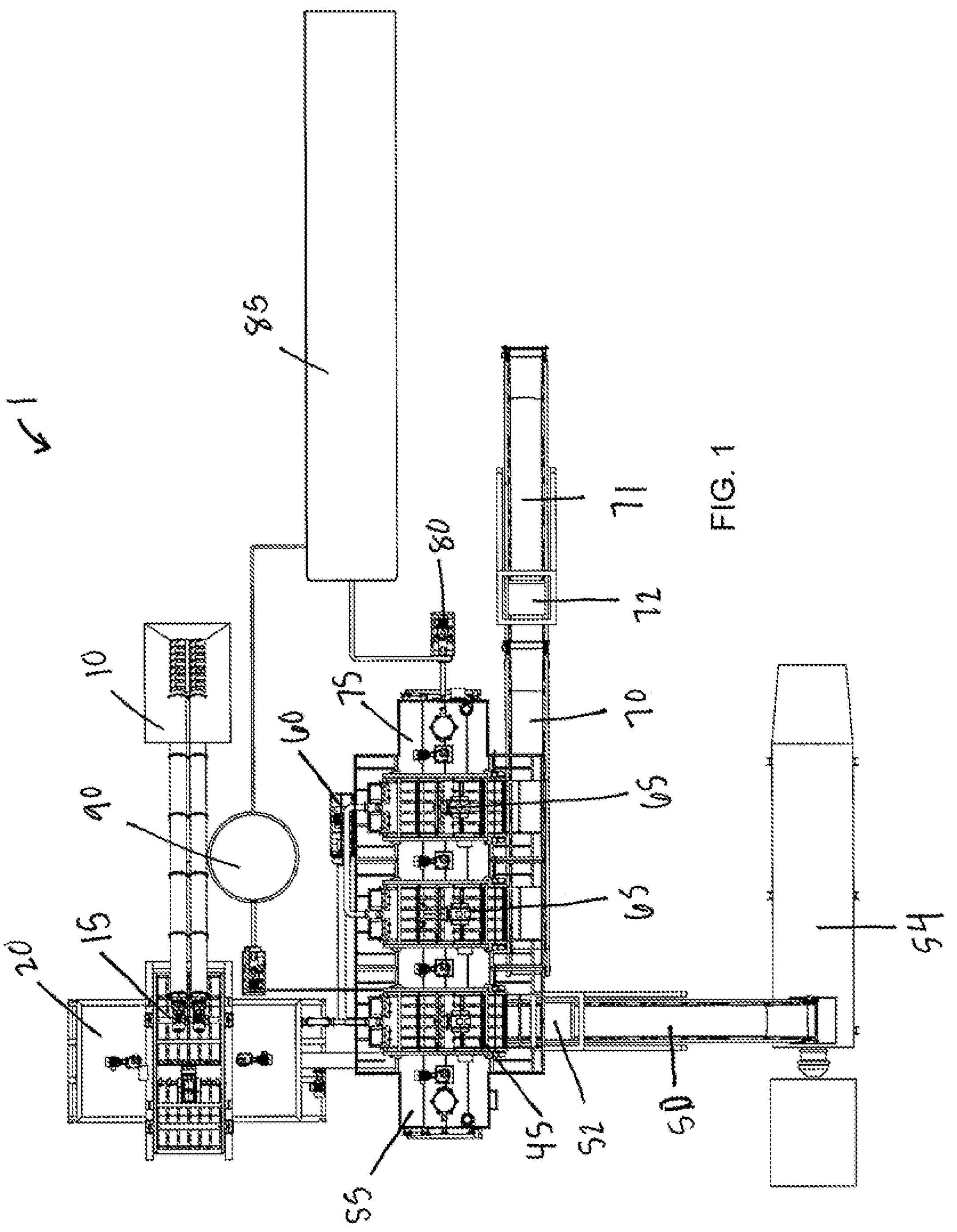
FIG. 1 is a top view of an embodiment of the system for recycling animal bedding material.
Figure 2:
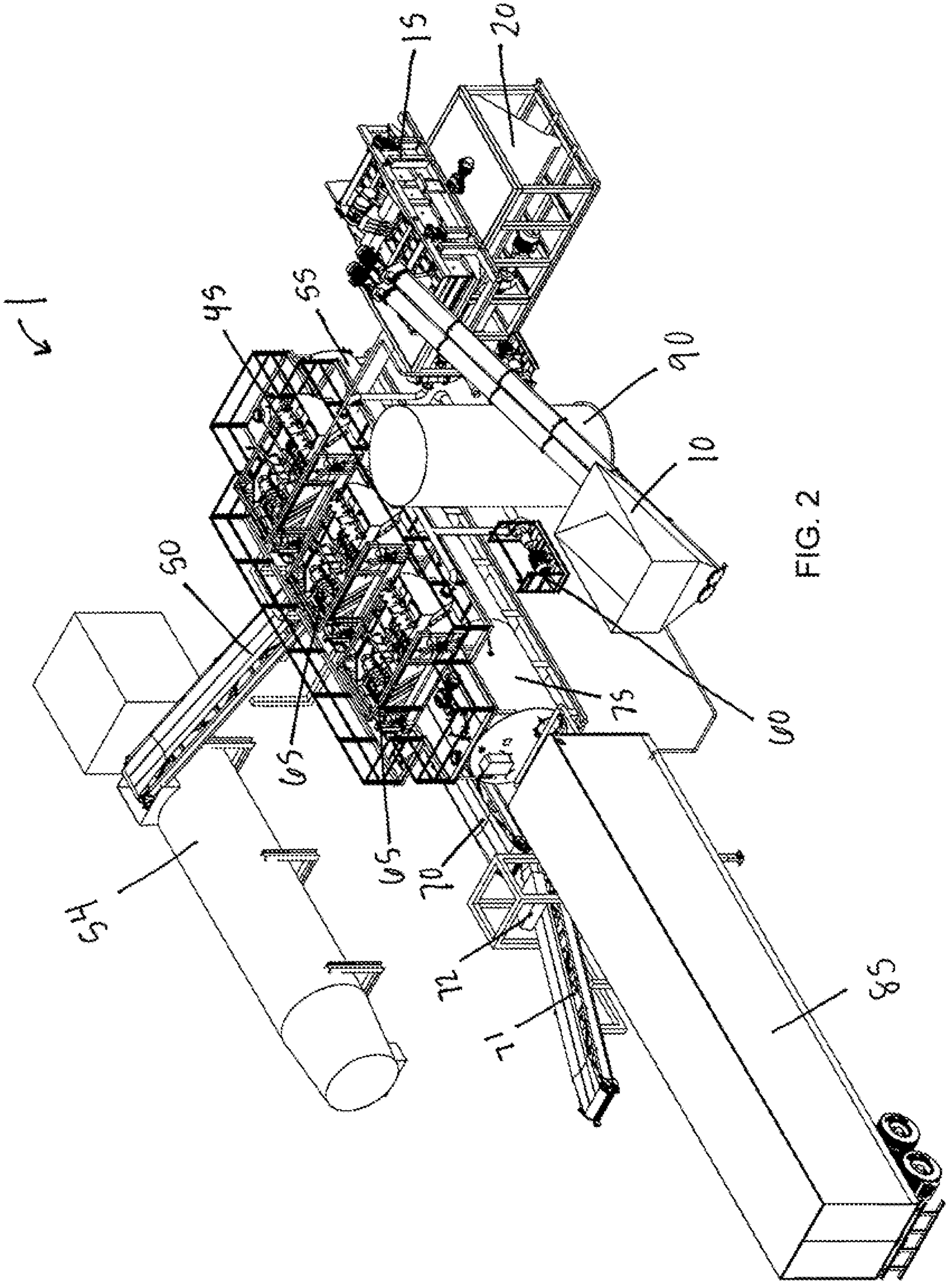
FIG. 2 is a perspective view of the embodiment of the system shown in FIG. 1.
Figure 3:
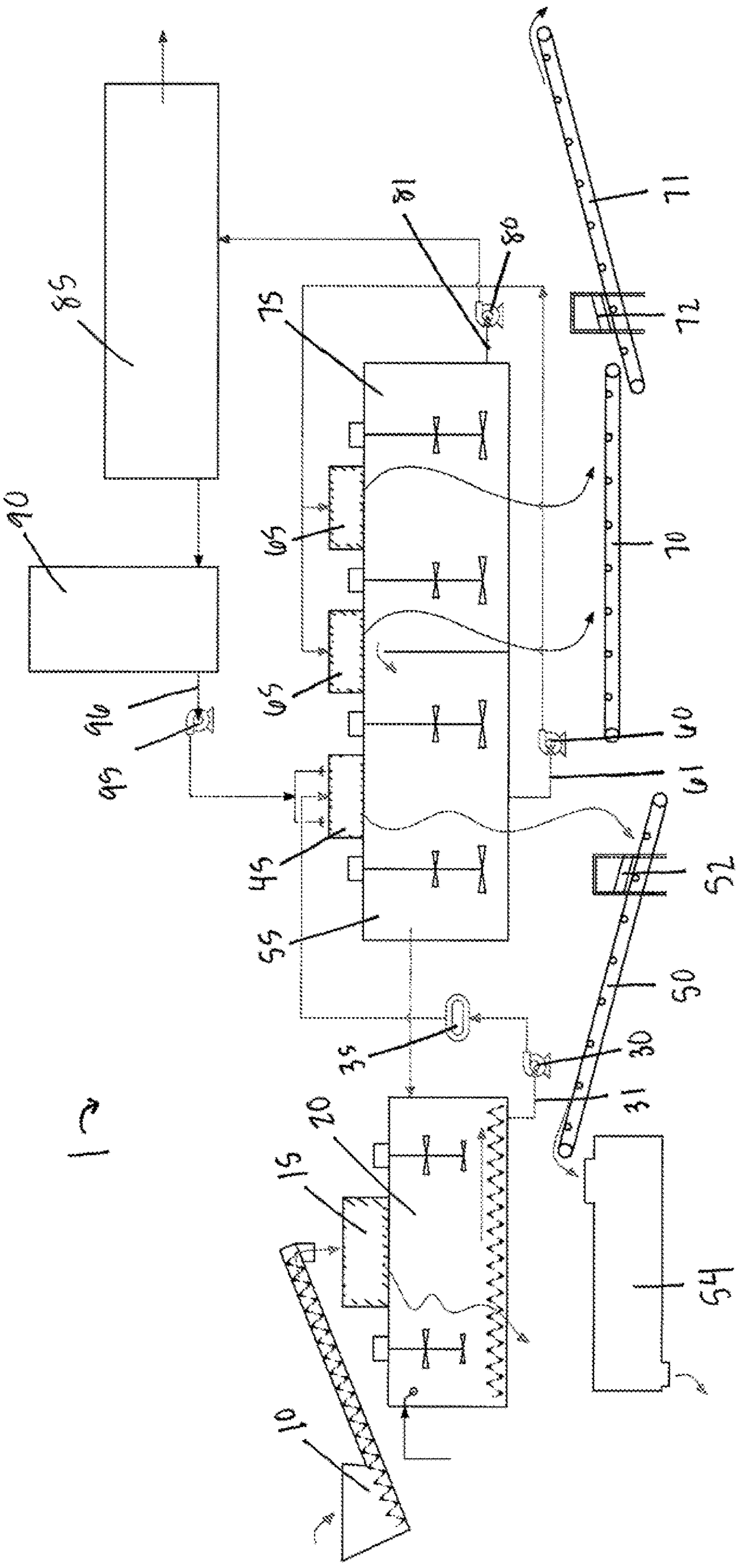
FIG. 3 is a schematic view of the embodiment of the system shown in FIG. 1.

With reference to the figures where like elements have been given like numerical designation to facilitate an understanding of the disclosure, and particularly with reference to the embodiment disclosed in FIGS. 1-3, an animal bedding recycling system 1 is shown. The animal bedding recycling system 1 may be used to clean used animal bedding for reuse. The used animal bedding may consist of wood chips that may be contaminated with animal urine and manure. The animal bedding recycling system 1 is designed to clean the wood chips and separate them from manure and other solid contaminants to generate clean wood chips and additional products, including mulch products and fertilizer components, as disclosed herein. The animal bedding used in connection with the disclosed system may be used, for example, as bedding material for horses or for any other animal that may be housed in a stall area where the bedding material is placed on the stall floor. The animal bedding may also be used in duck boxes, animal cages, chicken coops, and in many other applications.

Figure 4A:
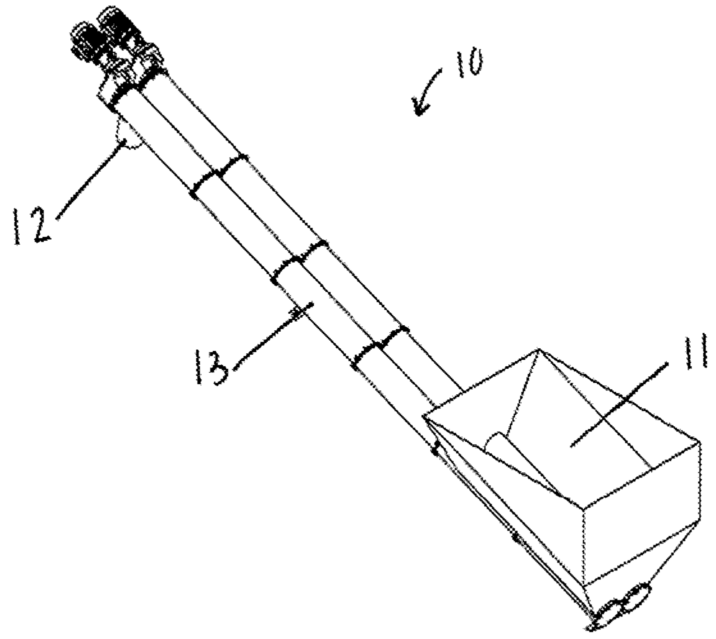
FIG. 4A is a perspective view of a hopper of the system shown in FIG. 1.
Figure 4B:
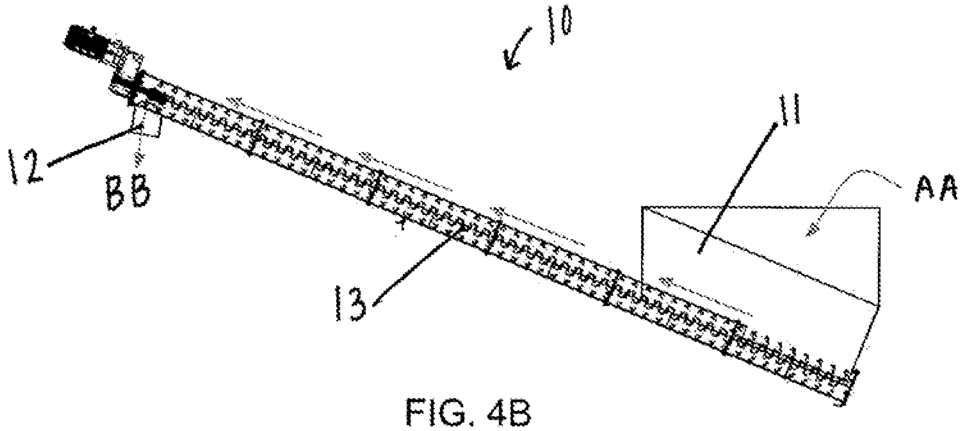
FIG. 4B is a cross-sectional view of the hopper shown in FIG. 4A.

The used animal bedding material may be loaded into hopper 10. Referring now to FIGS. 4A-4B, hopper 10 may have an inlet 11 and an outlet 12. The inlet 11 of hopper 10 may be configured to receive the used animal bedding material. Hopper 10 may transport the used animal bedding material from the inlet to the outlet via feeding system 13, wherein the used animal bedding material may then be discharged onto first shaker 15. In FIG. 4B, the loaded animal bedding material is denoted by arrows AA, and the discharged animal bedding material is depicted by arrows BB. Hopper 10 may be any type of hopper such as a dual-screw hopper with a double-screw feeding system. Dual screw hopper 10 is commercially available from DEL Corporation under model name Dual Screw Feeder.

Figure 5A:
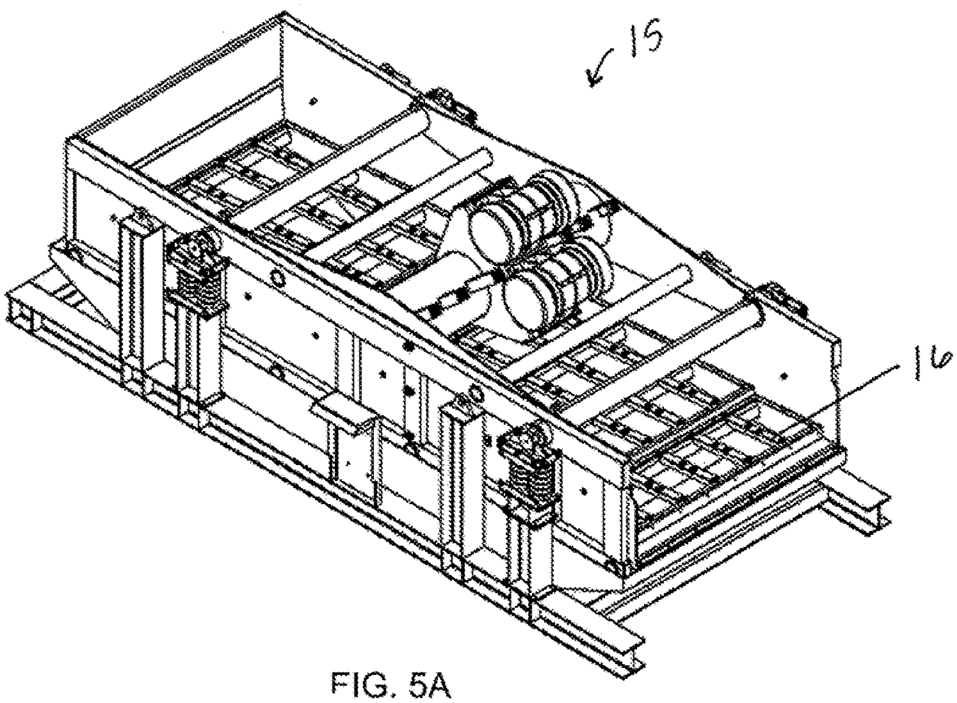
FIG. 5A is a perspective view of a first shaker of the system shown in FIG. 1.
Figure 5B:
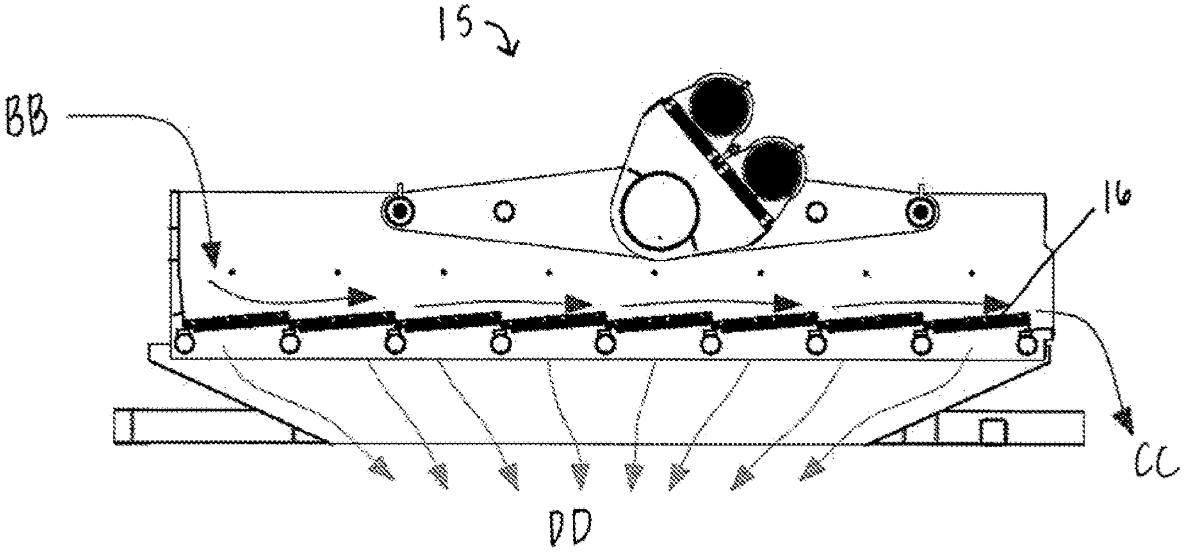
FIG. 5B is a cross-sectional view of the first shaker shown in FIG. 5A.

Referring to FIGS. 5A-5B, first shaker 15 may include one or more screen media 16 configured to capture a first solids and allow a second solids to pass through one or more screen media 16 as a first underflow. First shaker 15 may operate by sifting the used animal bedding material through one or more screen media 16. First shaker 15 may use a vibrating or shaking motion to sift the animal bedding material and collect the first solids. The first solids may be larger waste solids, such as manure and any other oversize debris, and the second solids may include smaller materials, such as used wood chips, mulch, and any manure or other material small enough to pass through one or more screen media 16. First shaker 15 may be configured to convey the first solids from first shaker 15 to a first solids stockpile for disposal or for further processing to produce fertilizer or soil additives. In FIG. 5B, the solids screened by first shaker 15 and conveyed to a first solids stockpile are denoted by arrows CC, while the underflow of second solids is denoted by arrows DD.

First shaker 15 may be any type of shaker. For example, first shaker 15 may be a linear scalping shaker commercially available from DEL Corporation under model name DELineator™. One or more screen media 16 may have opening sizes in the range of ¾ inch to 3 inches. In one example, the opening size is ¾ inch.

Figure 6A:
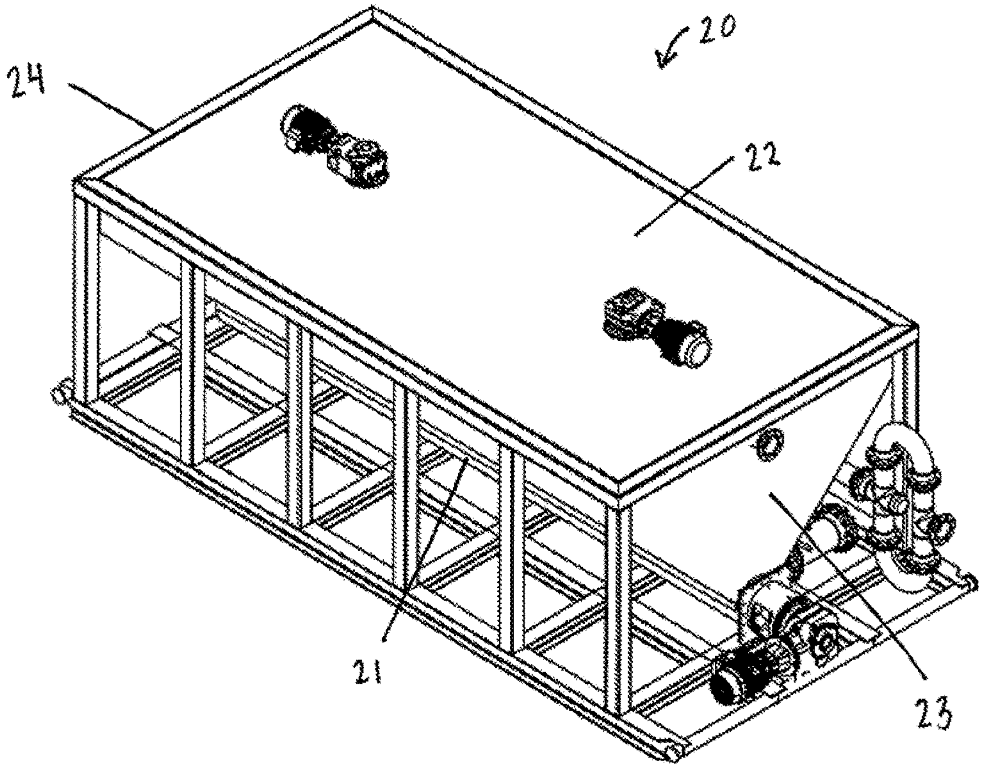
FIG. 6A is a perspective view of a first tank of the system shown in FIG. 1.
Figure 6B:
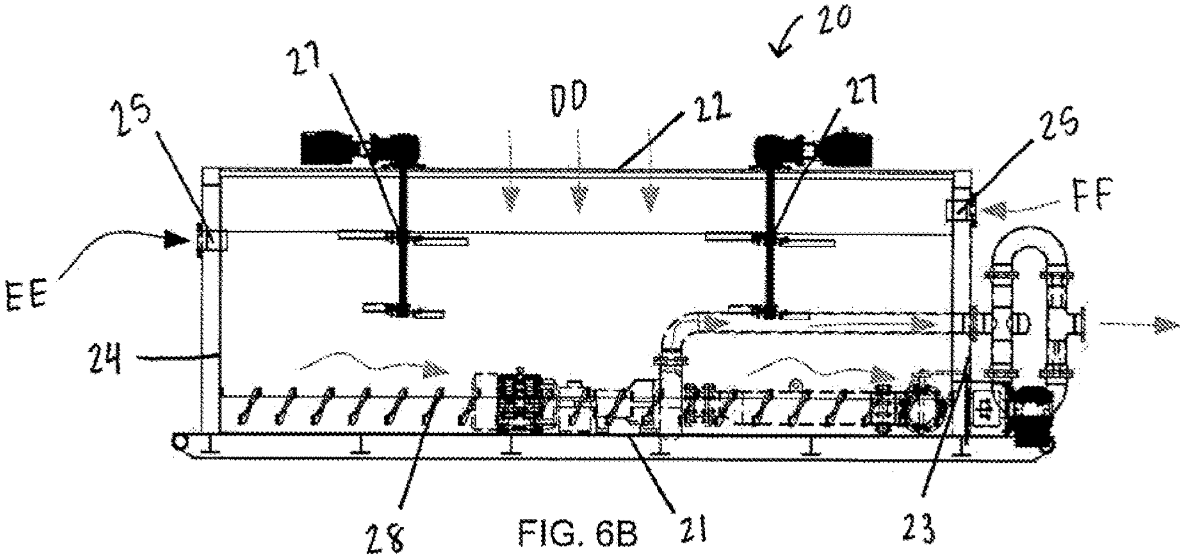
FIG. 6B is a cross-sectional view of the first tank shown in FIG. 6A.

After the second solids pass through one or more screen media 16 of first shaker 15, the second solids may flow into first tank 20. First tank 20 may be operatively positioned underneath first shaker 15 so as to receive the first underflow comprising second solids from first shaker 15. Referring to FIGS. 6A-6B, first tank 20 may be a v-shaped tank having a bottom 21 and a top 22, as well as a front section 23 and a rear section 24. First tank 20 may further include one or more first liquids inlets 25, which may include a fresh water inlet and/or a slurry recycle. In FIG. 6B, the fresh water inlet is denoted by arrows EE, and the slurry recycle is denoted by arrows FF. The fresh water inlet may flow into first tank 20 at a rate of approximately 5 to 10 gallons per minute at standard TPH. The slurry recycle is discussed in detail further herein.

In first tank 20, the second solids may be mixed with one or more first liquids inlets 25 by one or more mixers 27 to form a first slurry. One or more mixers 27 may be vertical agitators with dual impellers. One or more mixers 27 may force any floating or sinking second solids into suspension in the liquid flowing from one or more liquid inlets 25. The first slurry may include water, wood chips, mulch material, and any manure or other materials small enough to pass through one or more screen media 16 of first shaker 15. The first slurry may further include any materials from the slurry recycle flowing into first tank 20. First tank 20 may also include auger 28 positioned at the bottom of first tank 20. For any materials in the first slurry that may settle to the bottom of first tank 20, auger 28 may convey the settled materials from the rear section to the front section of first tank 20. Auger 28 may be a shaftless auger commercially available from DEL Corporation under model name Shaftless Auger.

Referring back to FIG. 3, the first slurry may then flow into first suction pump 30. First suction pump 30 may be in fluid communication with first conduit 31 having an inlet and an outlet. First suction pump 30 may pump the first slurry from the inlet to the outlet of first conduit 31. The inlet may be operatively positioned at the bottom 21 of the front section 23 of first tank 20. The inlet may be positioned adjacent to auger 28 so that any materials in the first slurry that settle to the bottom of first tank 20 may flow into first suction pump 30. First suction pump 30 may pump the first slurry in a range of 1000 to 2000 gallons per minute at standard TPH. For example, first suction pump 30 may pump the first slurry at a rate of approximately 1500 gallons per minute at standard TPH. It is to be understood that various types of pumps may be used to pump the first slurry from first tank 20.

Figure 7A:
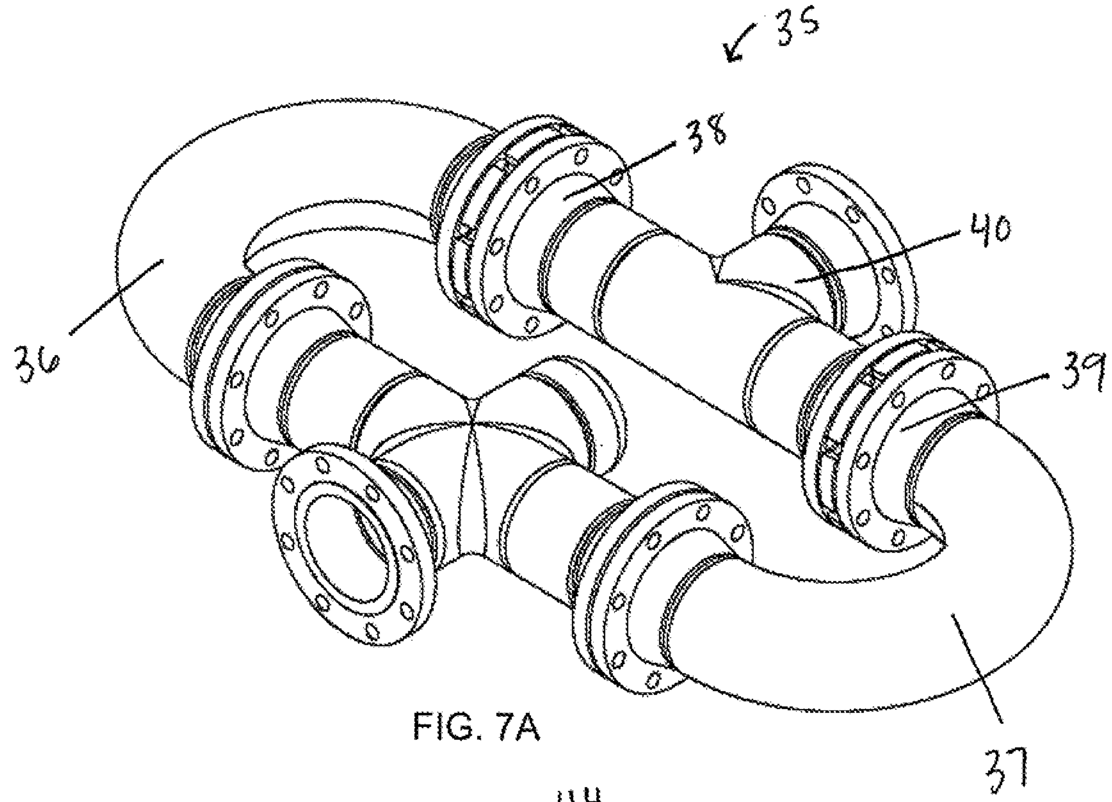
FIG. 7A is a perspective view of a slurry collider of the system shown in FIG. 1.
Figure 7B:
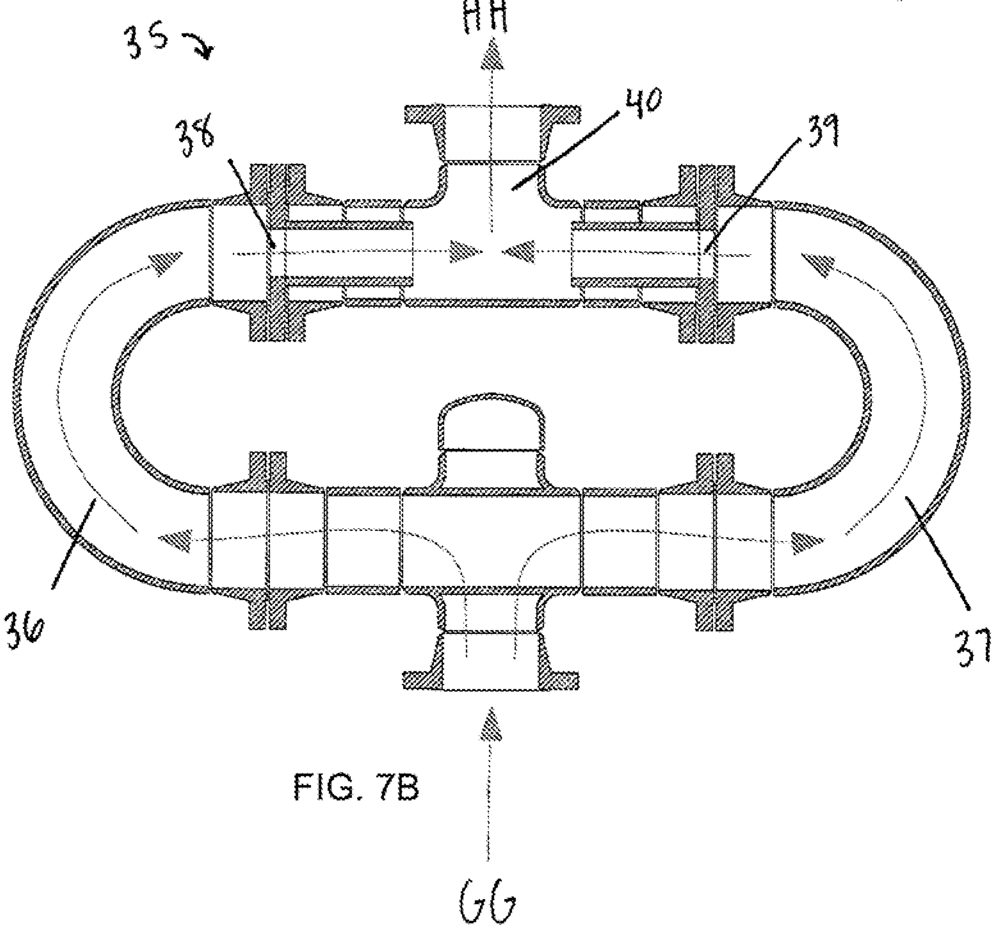
FIG. 7B is a cross-sectional view of the slurry collider shown in FIG. 7A.

The first suction pump 30 may pump the first slurry to slurry collider 35. As shown in FIGS. 7A-7B, slurry collider 35 may include first split flow 36, second split flow 37, first jet nozzle 38, second jet nozzle 39, and discharge 40. Slurry collider 35 may be configured to split the first slurry outlet of first conduit 31 (denoted by arrows GG) into first split flow 36 and second split flow 37. First split flow 36, comprising a first portion of the first slurry, may travel through first jet nozzle 38, and second split flow 37, comprising a second portion of the first slurry, may travel through second jet nozzle 39. First jet nozzle 38 and second jet nozzle 39 may have a diameter in the range of 2 inches to 4 inches. In one example, first jet nozzle 38 and second jet nozzle 39 may both have a diameter of 3 inches.

First split flow 36 and second split flow 37 may flow through the nozzles at a velocity in the range of 35 feet per second to 65 feet per second. For example first split flow 36 and second split flow 37 may each have a velocity of 40 feet per second. First jet nozzle 38 and second jet nozzle 39 may be configured to discharge first split flow 36 and second split flow 37, respectively, directly at one another. The direct impact between first split flow 36 and second split flow 37 may cause a fraction of the second solids in the first slurry to collide. This collision may cause the fraction of the second solids in the first slurry, such as the manure and mulch particles, to break down into smaller particles for further processing, forming a collided first slurry. This allows the smaller particles to be easily separated from the wood chips in the next step of the system. The collided first slurry is depicted by arrows HH in FIG. 7B. Discharge 40 of slurry collider 35 may be configured to collect the collided first slurry after it has traveled through first jet nozzle 38 and second jet nozzle 39. The discharge may be further configured to discharge the collided first slurry onto second shaker 45. Slurry collider 35 is commercially available from DEL Corporation under model name Slurry Collider.

Figure 8A:
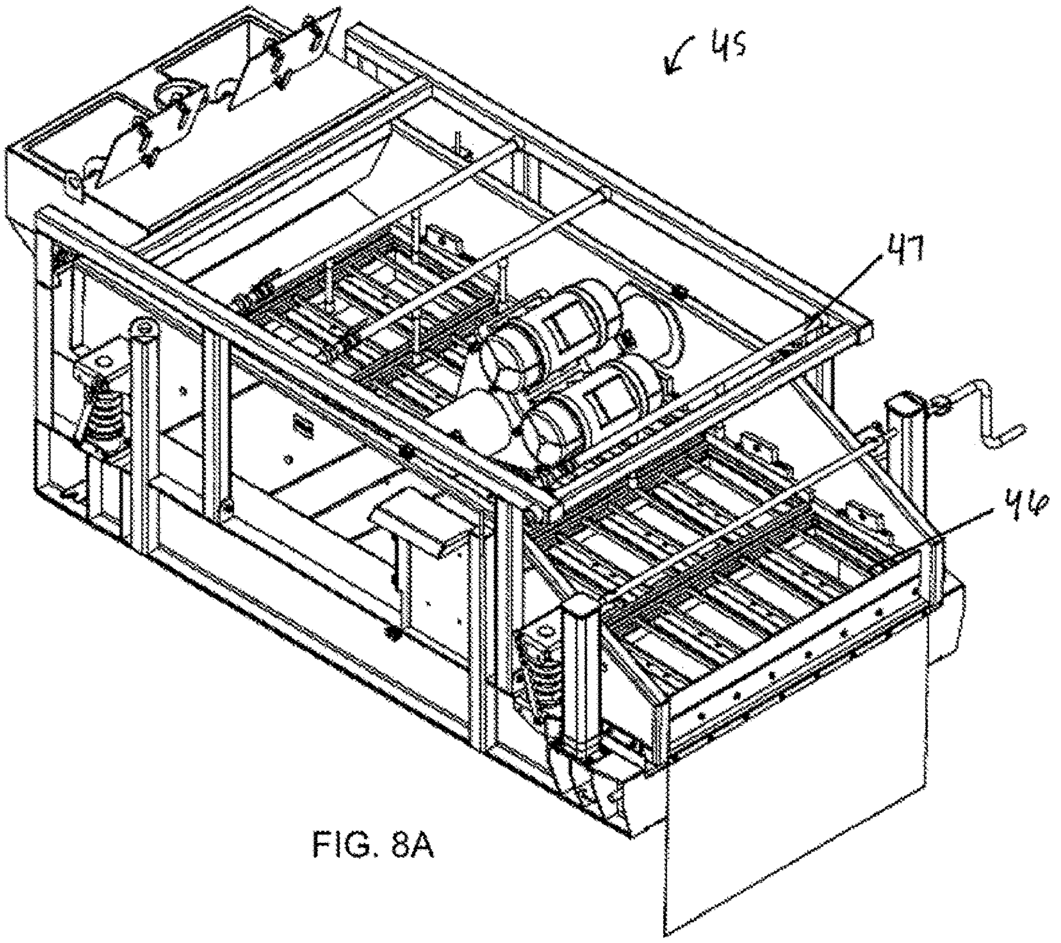
FIG. 8A is a perspective view of a second shaker of the system shown in FIG. 1.
Figure 8B:
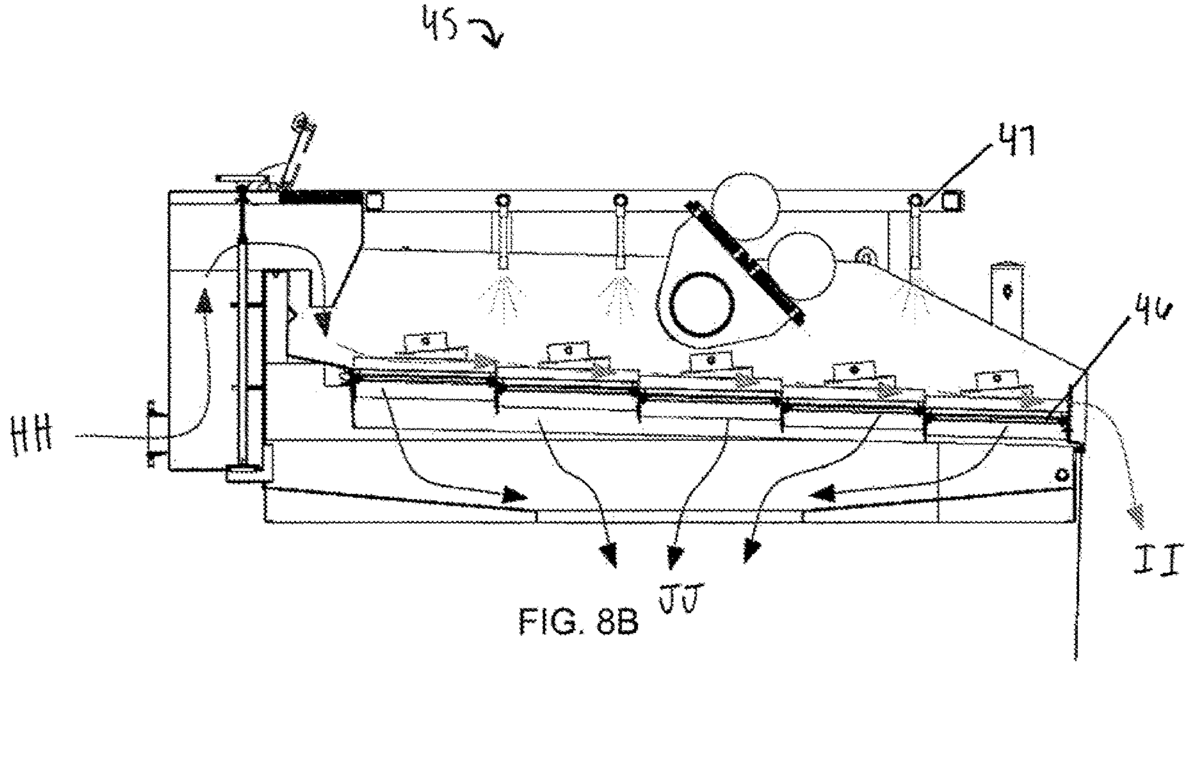
FIG. 8B is a cross-sectional view of the second shaker shown in FIG. 8A.

Referring now to FIGS. 1-3, second shaker 45 may be operatively positioned so as to receive the collided first slurry. Now referring to FIGS. 8A-8B, second shaker 45 may include one or more screen media 46 configured to retain a third solids from the collided first slurry and allow a second underflow to pass through. Second shaker 45 may operate by sifting the collided first slurry through one or more screen media 46. Second shaker 45 may use a vibrating or shaking motion to sift the collided first slurry and collect the third solids. The third solids may include wood chips and a minimal number of other particles, since the other particles in the collided first slurry were broken down into fine pieces as the particles traveled through slurry collider 35. In FIG. 8B, the third solids screened by second shaker 45 are denoted by arrows II, while the second underflow is denoted by arrows JJ.

Second shaker 45 may further be positioned underneath an optional spray bar system 47 configured to clean the third solids while on one or more screen media 46 of second shaker 45. Optional spray bar system 47 may flush the third solids with a second liquids comprising water and/or a cleaning agent. Second shaker 45 may be a linear scalping shaker commercially available from DEL Corporation under model name DELineator™. One or more screen media 46 may have openings ranging from ¼ inch to ½ inch. As an example, the one or more screen media 46 may have 14 inch openings.

Figure 9A:
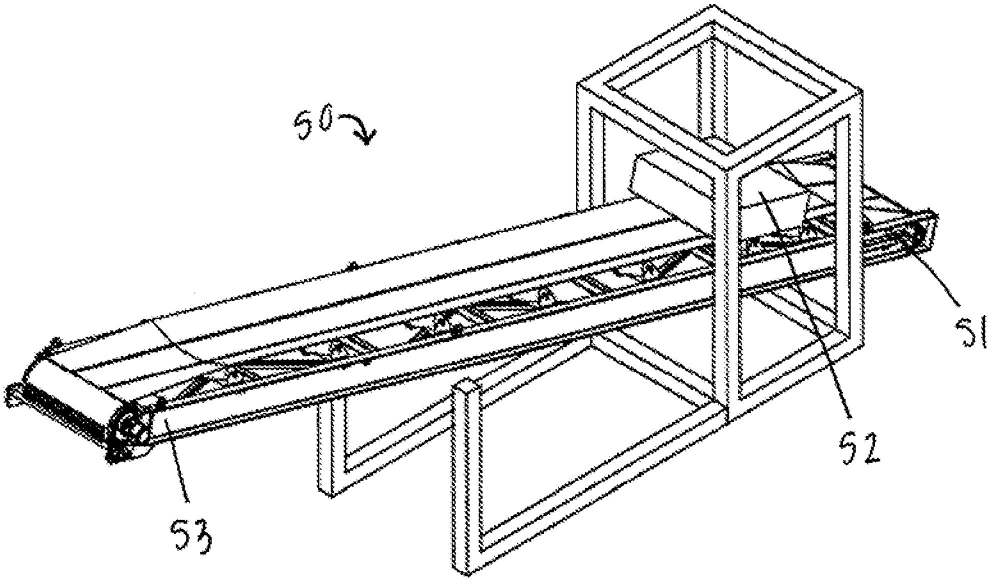
FIG. 9A is a perspective view of a first conveyor of the system shown in FIG. 1.
Figure 9B:
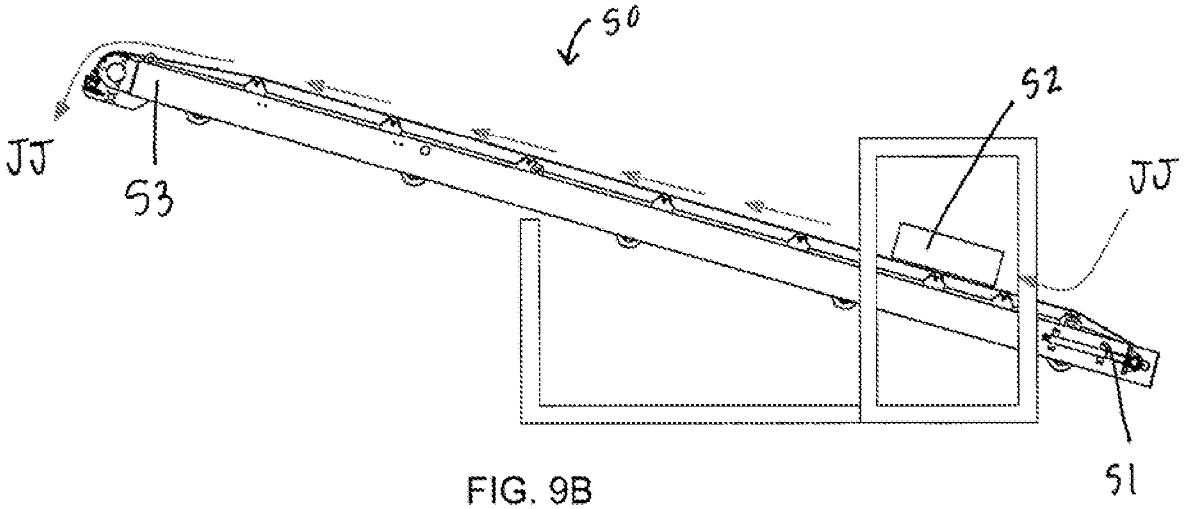
FIG. 9B is a cross-sectional view of the first conveyor shown in FIG. 9A.

After the third solids are retained, dewatered, and cleaned, second shaker 45 may be further configured to discharge the third solids onto first end 51 of first conveyor 50 shown in FIGS. 9A-9B. First conveyor 50 may be equipped with first magnet 52 to remove one or more metallic components from the third solids. First magnet 52 is commercially available from Walker Magnetics under model name Electromagnetic Suspended Separator. A second end 53 of first conveyor 50 may then discharge the third solids into dryer unit 54.

Figure 10:
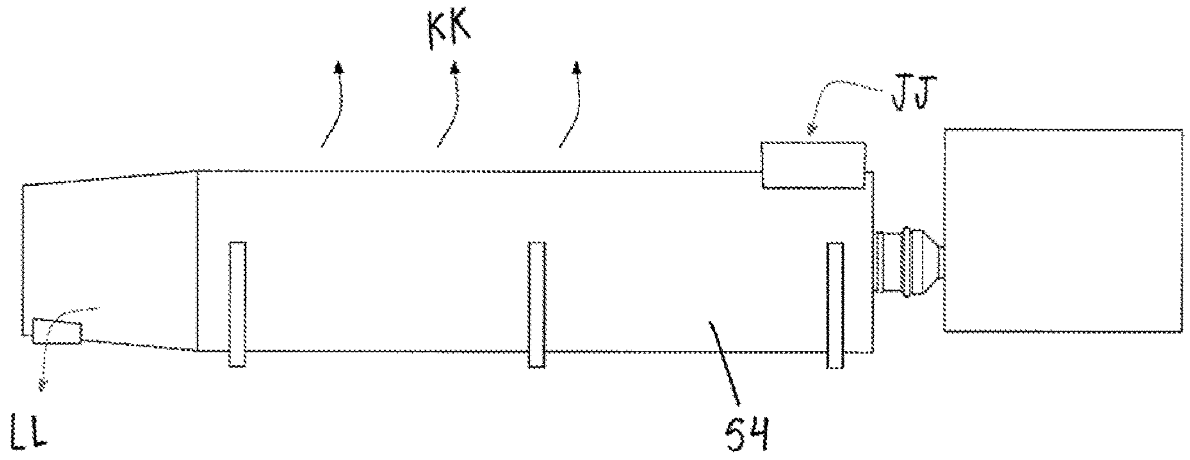
FIG. 10 is a perspective view of a dryer unit of the system shown in FIG. 1.

Dryer unit 54 may be configured to dry the third solids to a desired moisture content. FIG. 10 shows water vapor (depicted by arrows KK) being removed by dryer unit 54 and producing clean, dry third solids (depicted by arrow LL). The desired moisture content may be operatively related to the type of bedding material being dried. The desired moisture content may be in the range of 12% to 20%. An example of the desired moisture content may be 15%.

Dryer unit 54 may be any type of dryer. For example, dryer unit 54 may be a triple-pass dryer commercially available from Baker-Rullman Manufacturing under model name Triple Pass Rotary Drum Dryer. In this type of dryer, the dryer may have an inner cylinder, a middle cylinder, an outer cylinder, and a fuel burner. The third solids (depicted by arrows JJ) may first travel into the inner cylinder, where moisture is removed by a hot gas air stream produced by the fuel burner. Once the third solids lose enough moisture, the third solids then move into the middle cylinder, where more moisture is removed by the hot gas air stream. After enough moisture has been removed, the third solids then move into the outer cylinder, where the third solids are dried to the final moisture content by the hot gas air stream.

Dryer unit 54 may dry the third solids to the desired moisture content at a selected temperature and for a selected period of time. The selected temperature and selected period of time may depend on the desired moisture content and the type of bedding material being dried. The selected temperature may be in the range of 200 degrees F. to 800 degrees F. An example of a selected temperature may be 350 degrees F. The selected time period may be in the range of one minute to twenty minutes An example of the selected time period is four minutes. Dryer unit 54 may be further configured to discharge the dried third solids (depicted by arrow LL) into a third solids stockpile, which may include a stockpile container.

The dried third solids discharged from dryer unit 54 may comprise clean, dry wood chips that may be reused as animal bedding material. The clean, dry wood chips may be packaged for resale or sold in bulk via a roll-off container, end dump, or other transportation method.

While one or more screen media 46 of second shaker 45 retains the third solids, one or more screen media 46 may allow a second slurry to pass through. This second slurry underflow may include water, mulch material, and any manure or other materials from the first slurry small enough to pass through the one or more screen media of second shaker 45. The second slurry underflow is denoted in FIG. 8B by arrows JJ.

Figure 11A:
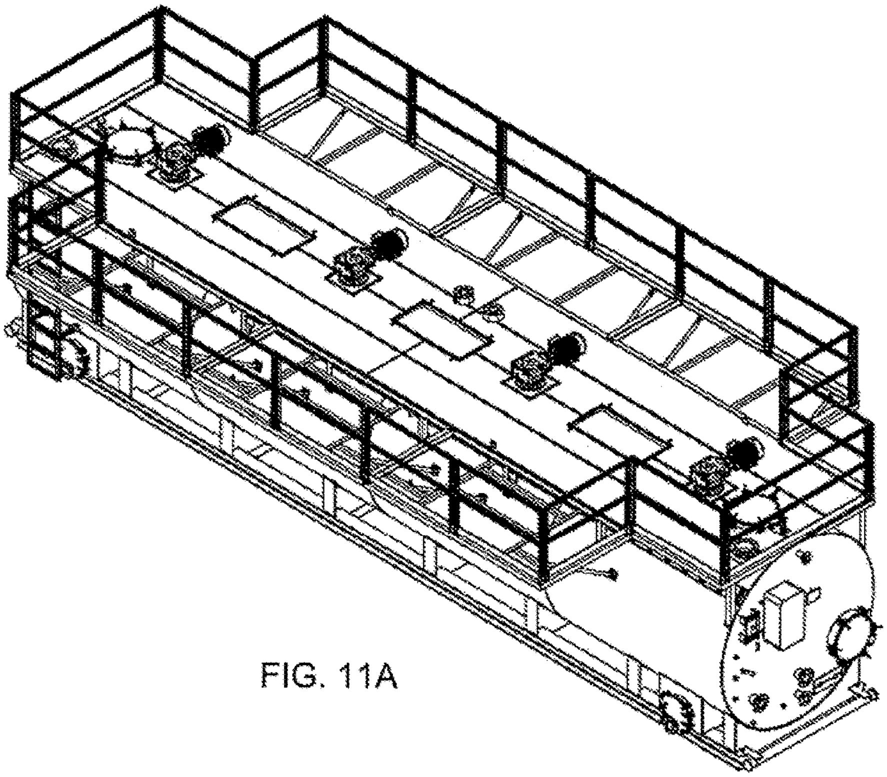
FIG. 11A is a perspective view of a second and third tank of the system shown in FIG. 1.
Figure 11B:
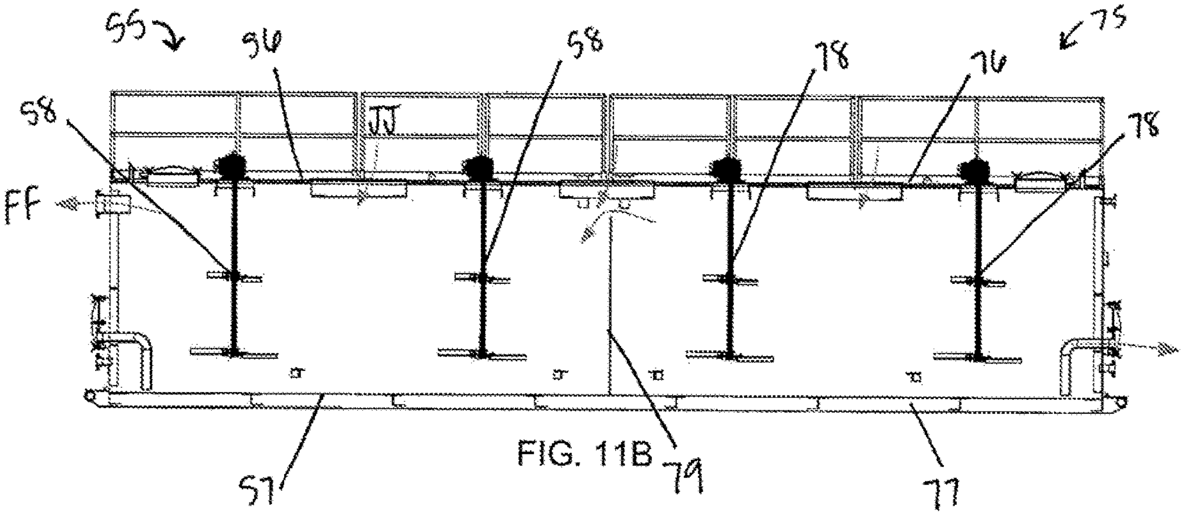
FIG. 11B is a cross-sectional view of the second and third tank shown in FIG. 11A.

After the second slurry passes through second shaker 45, the second slurry may then flow into second tank 55. Referring specifically to FIGS. 11A-11B, second tank 55 may have a top 56 and a bottom 57 and may include one or more mixers 58 to force any solid particles in the second slurry that float or that may settle to the bottom 57 of second tank 55 into suspension. One or more mixers 56 may be vertical agitators with dual impellers. Second tank 55 may have slurry recycle (denoted in FIG. 11B by arrows FF) to send a portion of the second slurry in second tank 55 back into first tank 20.

Referring collectively to FIGS. 1-3, the second slurry in second tank 55 may then flow into second suction pump 60. Second suction pump 60 may be in fluid communication with second conduit 61 having an inlet and an outlet. The inlet of second conduit 61 may be operatively positioned at the bottom 57 of second tank 55. Second suction pump 60 may pump the second slurry from the inlet to the outlet of second conduit 61. The outlet of second conduit 61 may be configured to discharge the second slurry into one or more third shakers 65. Second suction pump 60 may pump the second slurry at a rate in the range of about 500 gallons per minute at standard TPH to 2000 gallons per minute at standard TPH. An example of the slurry rate is 1500 gallons per minute at standard TPH. It is to be understood that second suction pump 60 may be any type of pump.

Figure 12A:
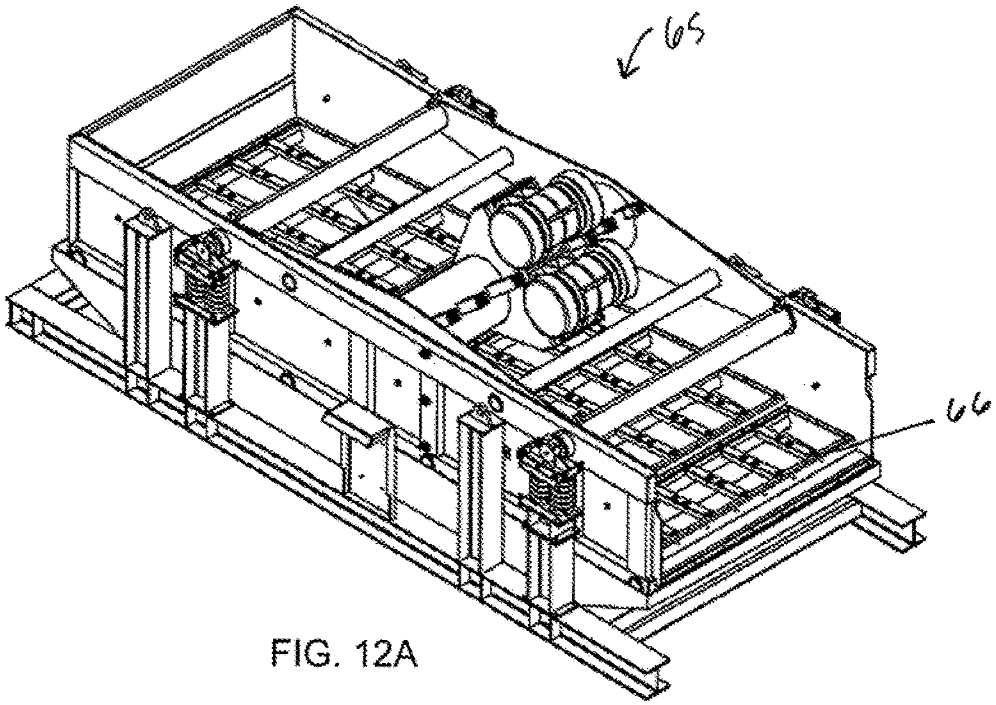
FIG. 12A is a perspective view of a third shaker of the system shown in FIG. 1.
Figure 12B:
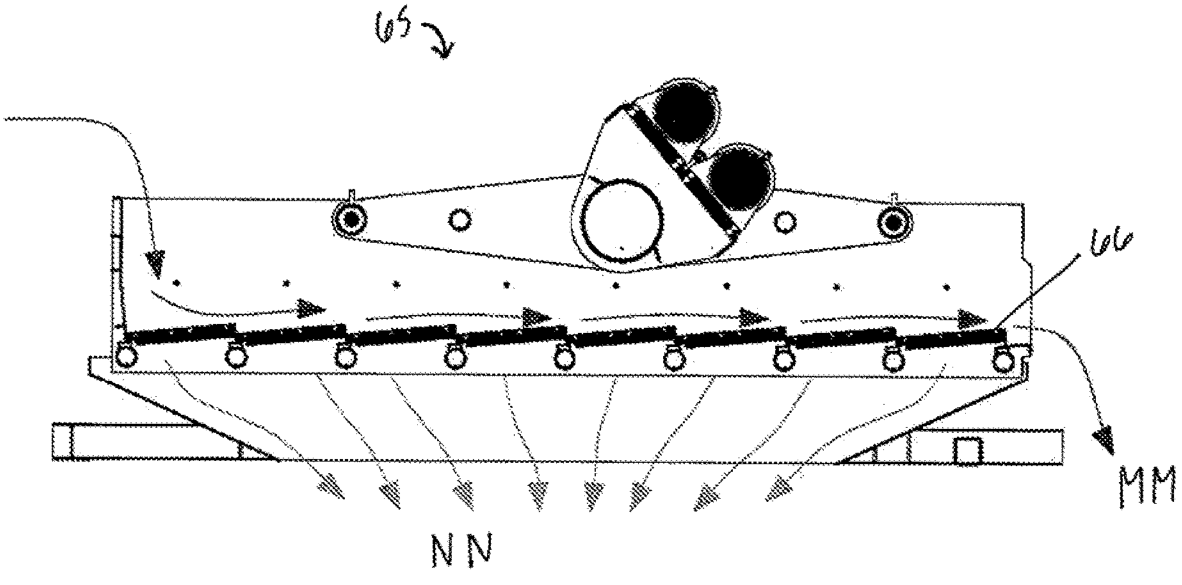
FIG. 12B is a cross-sectional view of the third shaker shown in FIG. 12A.
Figure 13A:
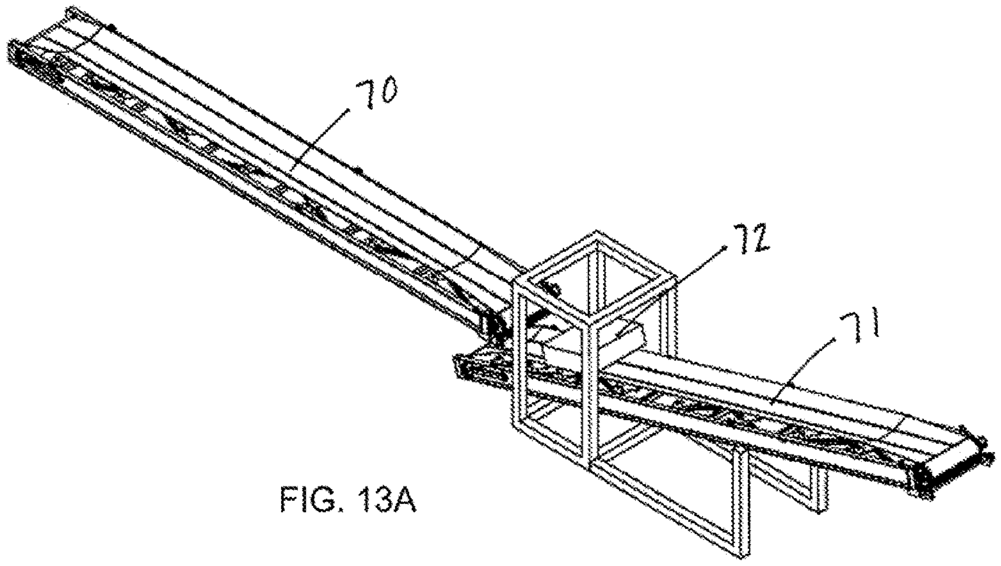
FIG. 13A is a perspective view of a second and third conveyor of the system shown in FIG. 1.
Figure 13B:
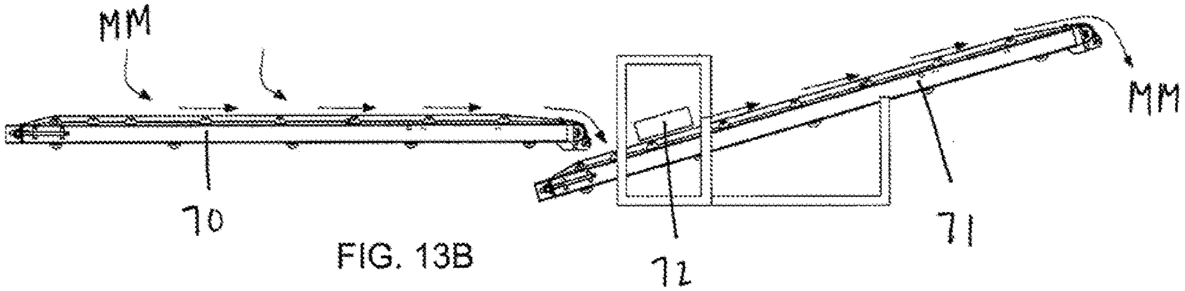
FIG. 13B is a cross-sectional view of the second and third conveyor shown in FIG. 13A.

One or more third shakers 65 may be operatively positioned so as to receive the second slurry. Referring to FIGS. 12A-12B, one or more third shakers 65 may include one or more screen media 66 configured to retain a fourth solids from the second slurry and allow a third underflow comprising a third slurry to pass through. One or more third shakers 65 may operate by sifting the second slurry through one or more screen media 66. One or more third shakers 65 may use a vibrating or shaking motion to sift the second slurry and collect a fourth solids. The fourth solids may comprise mulch, while the third slurry may include water and manure or other materials small enough to pass through the one or more screen media of one or more third shakers 65. In FIG. 12B, the fourth solids screened by one or more third shakers 65 and conveyed to a fourth solids stockpile are denoted by arrows MM, while the third underflow comprising a third slurry is denoted by arrows NN.

In the embodiment depicted in FIGS. 1-3, one or more third shakers 65 may include two linear scalping shakers. One or more third shakers 65 is commercially available from DEL Corporation under model name DELineator™. The one or more screen media 66 may have a mesh size in the range of API 70 to API 200. An example of the mesh size is API 100.

After the fourth solids are retained and dewatered, one or more third shakers 65 may be further configured to discharge the fourth solids onto second conveyor 70. Second conveyor 70 may then discharge the cumulative fourth solids from one or more third shakers 65 onto third conveyor 71. Third conveyor 71 may include second magnet 72 to remove one or more metallic components from the fourth solids. Second magnet 72 is commercially available from Walker Magnetics under model name Electromagnetic Suspended Separator. Third conveyor 71 may be configured to discharge the fourth solids into a fourth solids stockpile, which may include a stockpile container. The fourth solids may comprise mulch that may be sold as a fertilizer or soil amendment. In an alternate embodiment, one or more third shakers 65 may be configured to discharge the fourth solids onto a singular conveyor equipped with a magnet and adapted to discharge the fourth solids into a fourth solids stockpile.

The third slurry passing through one or more third shakers 65 may then flow into third tank 75 shown in FIGS. 11A-11B. Third tank 75 may have a top 76 and a bottom 77 and may include one or more mixers 78 to force the solid particles in the third slurry that float or that may settle to the bottom 77 of third tank 75 into suspension. One or more mixers 78 may be vertical agitators with dual impellers. As shown in the embodiment depicted in FIGS. 3, 11A, and 11B, second tank 55 and third tank 75 may be formed from a single tank separated by dividing wall 79 that allows an overflow from third tank 75 to flow into second tank 55.

As shown in FIGS. 1-3, the third slurry in third tank 75 may then flow into third suction pump 80. Third suction pump 80 may be in fluid communication with third conduit 81 having an inlet and an outlet. The inlet of the third conduit 81 may be operatively positioned at the bottom of third tank 75 such that the third slurry may flow into the inlet of third conduit 81. In the embodiment depicted in FIGS. 1-3, third suction pump 80 may pump the third slurry from the inlet to the outlet, where it may then be discharged into water treatment unit 85. Third suction pump 80 may pump the first slurry at a rate of about 50 gallons per minute at standard TPH to about 500 gallons per minute at standard TPH. An example of the slurry rate may be about 100 gallons per minute at standard TPH. It is to be understood that third suction pump 80 could be any type of pump.

Water treatment unit 85 may be a filter press, belt press, centrifuge, or other equipment capable of producing a clean effluent from the third slurry to produce a fifth solids. For example, water treatment unit 85 may be a belt press, which is commercially available from PHOENIX under model name Belt Filter Press. The fifth solids may include the fine solids in the third slurry, which may then be discharged into a fifth solids stockpile, which may include a container. The fifth solids may be used or sold as a fertilizer component or soil amendment.

Water treatment unit 85 may produce a clean effluent. The clean effluent may comprise clean water that may then be transported into fourth tank 90 for storage. As shown in FIG. 3, the clean effluent in fourth tank 90 may flow into fourth suction pump 95. Fourth suction pump 95 may be in fluid communication with fourth conduit 96 having and inlet and an outlet. The inlet may be operatively positioned at the bottom of fourth tank 90. Fourth suction pump 95 may pump the clean effluent from the inlet to the outlet of fourth conduit 96. The outlet of fourth conduit 96 may be operatively connected to spray bars 47 located over second shaker 45 so that the clean effluent can be used to clean the third solids—the wood chips. Fourth suction pump 95 may pump the clean effluent to spray bars 47 at a rate of about 50 gallons per minute at standard TPH to about 500 gallons per minute at standard TPH. As an example, the rate may be about 100 gallons per minute at standard TPH. It is to be understood that fourth suction pump 95 may be any type of pump.

While preferred embodiments of the present invention have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A system for cleaning used animal bedding material, comprising:

a first shaker adapted to separate a first solids from the used animal bedding material and produce a first underflow comprising a second solids, wherein the first solids comprises manure, wherein the second solids comprises wood chips and mulch;

a first tank adapted to mix the first underflow with a first liquids to form a first slurry, wherein the first liquids comprises water;

a slurry collider adapted to reduce the size of a fraction of the second solids in the first slurry and produce a collided first slurry, wherein the fraction of the second solids comprises mulch; and a second shaker adapted to separate a third solids from the collided first slurry and produce a second underflow comprising a second slurry; wherein the third solids comprises wood chips.

2. The system of claim 1, wherein the slurry collider comprises a first jet nozzle and a second jet nozzle, wherein the first jet nozzle is configured to discharge a first portion of the first slurry toward the second jet nozzle, wherein the second jet nozzle is configured to discharge a second portion of the first slurry toward the first jet nozzle.

3. The system of claim 1, wherein the second shaker is further adapted to discharge the third solids onto a first conveyor, wherein the first conveyor is adapted to place the third solids into a dryer.

4. The system of claim 3, further comprising:

a magnet adapted to remove one or more metallic components from the third solids while on the first conveyor; and wherein the dryer is adapted to remove a desired moisture content from the third solids before placing the third solids into a third solids stockpile.

5. The system of claim 3, further comprising:

one or more third shakers adapted to separate a fourth solids from the second slurry and produce a third underflow comprising a third slurry, wherein the fourth solids comprises mulch.

6. The system of claim 5, wherein the one or more third shakers is further adapted to discharge the fourth solids onto a second conveyor, wherein the second conveyor is adapted to place the fourth solids into a fourth solids stockpile.

7. The system of claim 6, further comprising:

a magnet adapted to remove one or more metallic components from the fourth solids while on the second conveyor.

8. The system of claim 5, further comprising:

a water treatment unit adapted to separate a third liquids from the third slurry, produce a fifth solids, and place the fifth solids into a fifth solids stockpile, wherein the third liquids comprises a clean effluent.

9. The system of claim 8, wherein the water treatment unit is further adapted to discharge the third liquids into a storage tank for reuse within the system.

10. The system of claim 8, further comprising:

a hopper adapted to place the used animal bedding onto the first shaker.

11. The system of claim 1, further comprising:

a spray bar system adapted to flush the third solids on the second shaker with a second liquids, wherein the second liquids comprises water.

12. The system of claim 11, wherein the second liquids further comprises a cleaning agent.

13. A method of cleaning used animal bedding material, comprising the steps of:

a) separating a first solids from the used animal bedding material in a first shaker to produce an underflow comprising a second solids, wherein the first solids comprises manure, wherein the second solids comprises wood chips and mulch;

b) mixing the second solids with a first liquids to produce a first slurry, wherein the first liquids comprises water;

c) reducing the size of a fraction of the second solids in the first slurry in a slurry collider to produce a collided first slurry, wherein the fraction of the second solids comprises mulch; and d) separating a third solids from the collided first slurry in a second shaker to produce a second slurry; wherein the third solids comprises wood chips.

14. The method of claim 13, wherein the slurry collider comprises a first jet nozzle and a second jet nozzle, wherein the first jet nozzle is configured to discharge a first portion of the first slurry toward the second jet nozzle, wherein the second jet nozzle is configured to discharge a second portion of the first slurry toward the first jet nozzle.

15. The method of claim 13, further comprising the step of:

e) discharging the third solids onto a first conveyor for placement into a dryer.

16. The method of claim 15, further comprising the steps of:

f) passing the third solids under a magnet to remove one or more metallic components from the third solids while on the first conveyor; and g) drying the third solids in the dryer to remove a desired moisture content from the third solids before the dryer places the third solids into a third solids stockpile.

17. The method of claim 15, further comprising the step of:

e) separating a fourth solids from the second slurry in one or more third shakers to produce a third slurry, wherein the fourth solids comprises mulch.

18. The method of claim 17, further comprising the step of:

f) discharging the fourth solids onto a second conveyor for placement into a fourth solids stockpile.

19. The method of claim 18, further comprising the step of:

g) passing the fourth solids under a magnet to remove one or more metallic components from the fourth solids while on the second conveyor.

20. The method of claim 17, further comprising the steps of:

f) separating a third liquids from the third slurry in a water treatment unit to produce a fifth solids, wherein the third liquids comprises a clean effluent; and g) disposing of the fifth solids into a fifth solids stockpile.

21. The method of claim 20, further comprising the step of:

h) storing the third liquids in a storage tank for reuse within the system.

22. The method of claim 13, further comprising the step of:

e) flushing the third solids on the second shaker with a second liquids via a spray bar system, wherein the second liquids comprises water.

23. The method of claim 22, wherein the second liquids further comprises a cleaning agent.

* * * * *